United States Patent [19]
Gross et al.

[11] Patent Number: 5,332,138
[45] Date of Patent: Jul. 26, 1994

[54] TISSUE CONTAINER FOR AUTOMOBILE VISOR

[75] Inventors: Sheldon H. Gross; Alan R. Tripp, both of Bryn Mawr; Michael J. Leonard, Philadelphia, all of Pa.

[73] Assignee: Tishumate, Inc., Bryn Mawr, Pa.

[21] Appl. No.: 57,284

[22] Filed: May 5, 1993

[51] Int. Cl.⁵ .......................................... F16M 13/02
[52] U.S. Cl. ................... 224/312; 224/277; 224/42.41; 248/905; 248/311.3; 296/37.8
[58] Field of Search ............ 224/277, 312, 311, 42.41, 224/42.42; 248/311.2, 311.3, 905; 296/37.8; 206/233

[56] References Cited

U.S. PATENT DOCUMENTS

| | | | |
|---|---|---|---|
| 2,256,204 | 9/1941 | Jameson | 248/905 X |
| 2,270,914 | 1/1942 | Williams | 224/312 X |
| 2,278,011 | 3/1942 | Murdock | 224/312 X |
| 2,287,581 | 6/1942 | Walker | 224/277 X |
| 2,503,859 | 4/1950 | Webber | 248/311.3 X |
| 2,564,997 | 8/1951 | Rome | 224/312 X |
| 2,826,334 | 3/1958 | Musler | 224/312 X |
| 3,026,999 | 3/1962 | Constantino | 224/277 |
| 3,204,762 | 9/1965 | Shanok et al. | 224/277 X |
| 3,214,059 | 10/1965 | Stark | 224/277 X |
| 3,685,777 | 8/1972 | Dema | 248/311.3 X |
| 3,801,056 | 4/1974 | Brody | 248/311.3 X |
| 3,843,085 | 10/1974 | Castro | 248/905 X |
| 5,029,787 | 7/1991 | Florentin | 248/905 X |

Primary Examiner—Ernest G. Cusick
Attorney, Agent, or Firm—Caesar, Rivise, Bernstein, Cohen & Pokotilow, Ltd.

[57] ABSTRACT

A tissue container which is mounted to the visor of a vehicle and which can be filled with tissues or a box of tissues without removing the container from the visor. The tissue container has a fairly narrow width so that it takes less head room in smaller vehicles. However, for larger vehicles, an increased number of tissues, which are greater in volume than the volume of the housing of the tissue container, may be inserted in the container. The container is mounted to the visor using elastic cords which stretch to accommodate the increased volume of the tissues or a larger box of tissues inserted in the container which has a greater volume than the volume inside the housing of the container.

10 Claims, 2 Drawing Sheets

TISSUE CONTAINER FOR AUTOMOBILE VISOR

BACKGROUND OF THE INVENTION

This invention relates generally to tissue holders that can be mounted on the visors of vehicles, and more specifically to tissue holders mounted on visors which can be filled without removal from the visor.

The use of tissue holders attached to the visors of vehicles is not new. Such devices make tissues available to the drivers or passengers in a convenient manner, and do not take any floor, seat or dashboard space. Types of tissue holders which use clips, spring holders, and brackets to support the tissue container include U.S. Pat. No. 2,564,997 (Rome); U.S. Pat. No. 2,278,011 (Murdock); and my patent, U.S. Pat. No. 5,065,970.

Although these tissue containers generally are suitable for the functions for which they are intended, they do have various shortcomings. The devices which depend upon springs and clips to secure the tissue container to the visor can cause a safety hazard by becoming detached in the case of accidents or collisions. In addition, tissue holders which are structured to carry a large number of tissues tend to take up needed head room in small vehicles.

There is, therefore, a need for a tissue holder which is structured to accept a smaller number of tissues, thereby taking up less head room in the car, but which is capable of holding a number of tissues whose volume extends beyond the volume of the tissue holder when it is desired to hold more tissues, and more head room is available in larger vehicles. Furthermore, there is a need for a tissue holder attached to the visor of a vehicle which can be filled without removing the tissue holder from its mounting on the visor.

OBJECTS OF THE INVENTION

Accordingly, it is the general object of the instant invention to provide a tissue holder which mounts on the visor of a vehicle and which improves upon, and overcomes the shortcomings of existing visor mounted tissue holders.

It is a further object of the instant invention to provide a tissue holder mounted on the sun visor of a vehicle which is easy to attach to the visor and which does not have a tendency to become detached in case of impact or collision.

It is yet a further object of this invention to provide a tissue holder which mounts on the visor of a vehicle and which occupies less head room space than existing visor mounted tissue holders.

It is still a further object of the instant invention to provide a tissue holder which is mounted on the visor of a vehicle which can hold tissues, or a box of tissues, of greater volume than the volume of the housing of the tissue holder.

It is still yet a further object of the instant invention to provide a tissue holder which mounts on the visor of a vehicle and which can be filled with tissues without removing the holder from the visor.

SUMMARY OF THE INVENTION

These and other objects of the instant invention are achieved by providing a tissue holder which is mounted on the visor of a vehicle which has a housing which is attached to the visor using elastic cords. The housing has an open bottom through which tissues can be filled by rotating the housing away from the visor, without removing the housing from the visor. Furthermore, the housing can be sized to hold a relatively small amount of tissues so as to minimize the amount of headspace taken in the vehicle. An increased volume of tissues, or a box of tissues, beyond the volume defined by the housing, may be inserted into the holder with the elastic cords stretching to include the additional volume and holding the tissues firmly against the visor.

DESCRIPTION OF THE DRAWING

Other objects of many of intended advantages of this invention will become readily appreciated as the same becomes better understood by reference to the following detailed description, when considered in connection with the accompanying drawings, wherein.

DETAILED DESCRIPTION OF THE PREFERRED EMBODIMENTS

Figure 1:
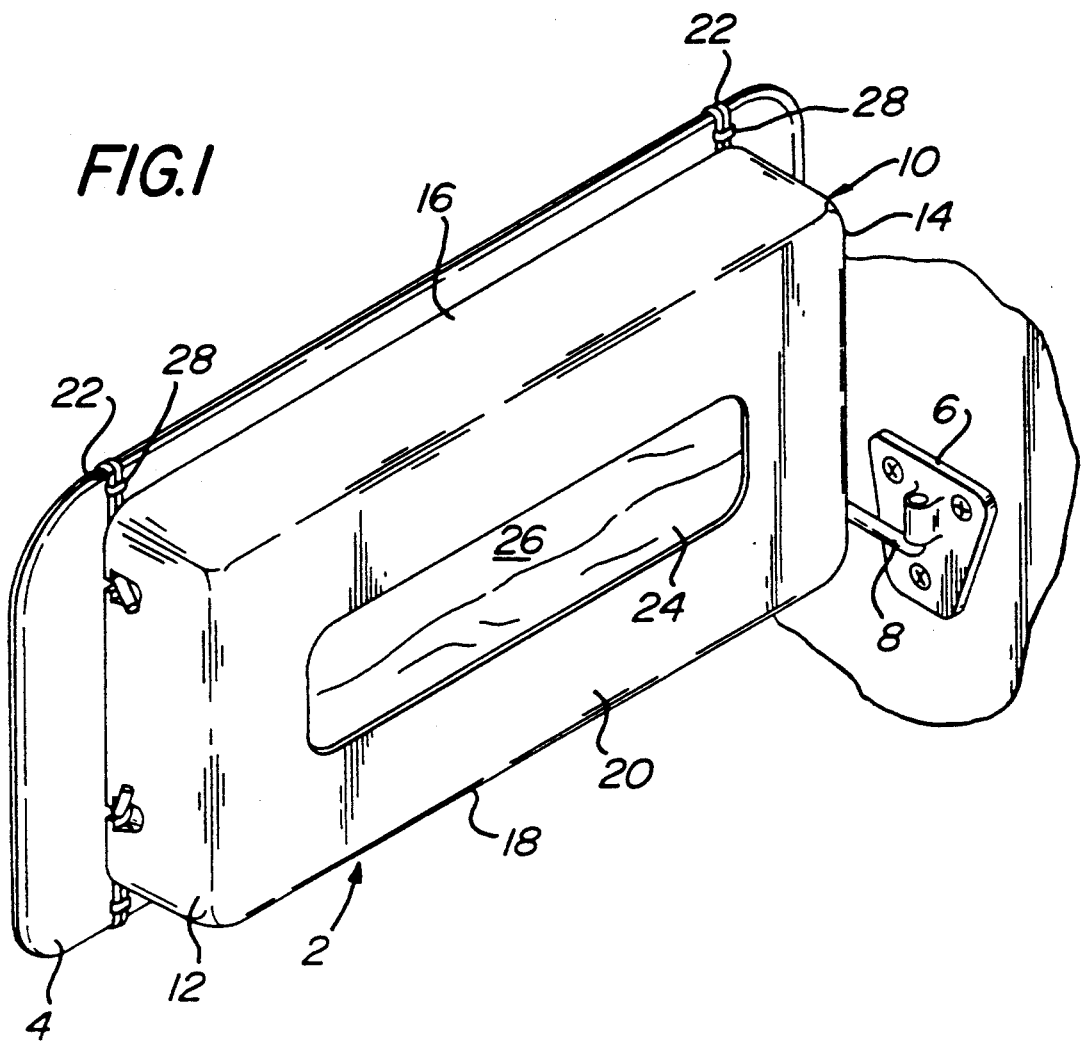
FIG. 1 is an isometric view of the tissue holder of this invention mounted on the visor of a vehicle.

Referring now in greater detail to the various figures of the drawing, wherein like reference characters refer to like parts, there is shown in FIG. 1 the tissue container 2 of this invention mounted on the visor 4 of a vehicle. The visor 4 is attached to the vehicle with a bracket 6 and a shaft 8 as is conventional.

The tissue container 2 comprises a housing 10 which has side walls 12 and 14, a top wall 16, a bottom wall 18 and a front wall 20. Elastic straps 22 hold the tissue container 2 against the visor 4 of the vehicle. The front wall 20 has an opening 24 for dispensing of tissues 26.

Although the tissues are shown loose in the tissue container 2, it should be kept in mind that the tissues can be in a tissue box and the tissue box installed in the container.

Figure 3:
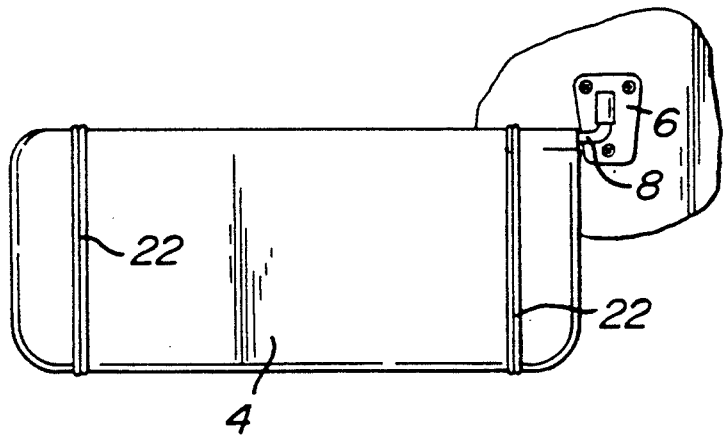
FIG. 3 is a rear view of the visor showing the elastic cords used to mount the tissue holder to the visor.
Figure 2:
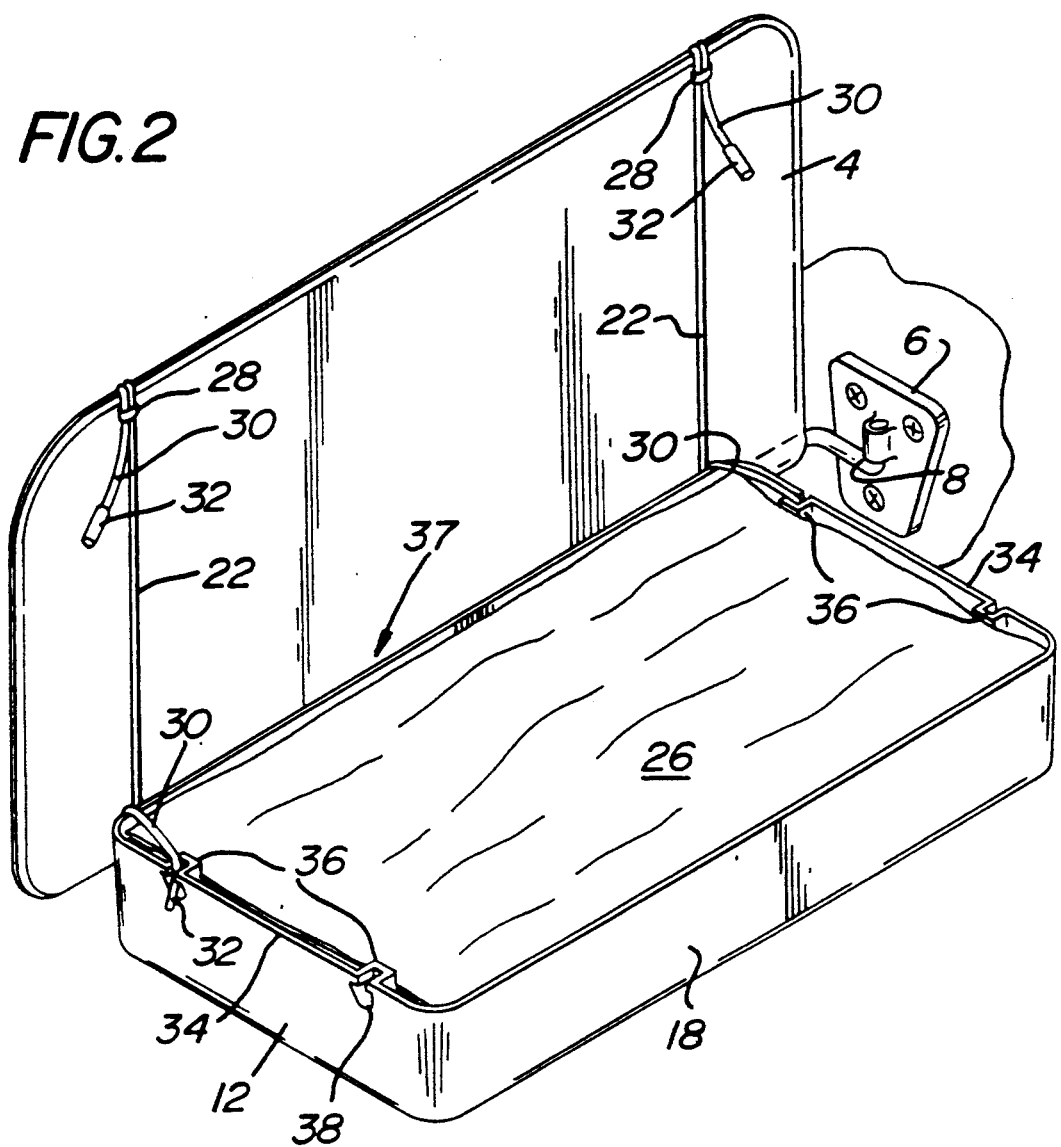
FIG. 2 is an isometric view of the tissue holder of this invention with the tissue holder rotated to the open position to allow for the filling of the holder with tissues without removing the tissue holder from the visor.

Referring now to FIG. 2, it can be seen that the tissue housing 10 has been rotated downward to expose the open back of the housing for the loading of tissues. The elastic cords 22 are looped around the sun visor 4 so that they are doubled at the rear of the sun visor as shown in FIG. 3. Clamps 28 connect the free ends 30 of the elastic cords 22 to the cords. A terminal element 32 is attached to each of the free ends 30 of the cords 22. The side walls 12 and 14 have an inner edge 34 which has indentations 36 as shown in FIG. 2. The terminal elements 32 are placed through the area defined by the indentations 36 and through openings 38 in the side walls 12 and 14.

After the tissues have been dispensed, the user merely disconnects the two upper terminal elements 32 from the housing so that the housing may be rotated downward for the insertion of more tissues. This is accomplished without removing the tissue container 2 from the visor 4.

For loading the tissues, the housing 10 is rotated about edge 3 of top wall 16 and held affixed to the visor 4 by the lower free ends 30 and terminal elements 32 of the elastic cords 22. After loading, the housing 10 is rotated upward and the two upper terminal elements 32 reinserted through openings 38.

Figure 4:
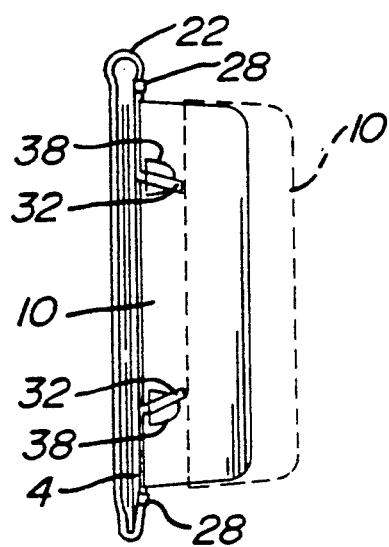
FIG. 4 is a side view of the tissue holder of this invention mounted on the visor showing the visor with solid lines holding a number of tissues which fit into the housing, and with dashed lines showing the position of the housing when additional tissues, greater than the volume of the housing, are inserted.

Referring now to FIG. 4, the housing 10 in solid lines, shows its position on the visor 4 with the housing filled up to the capacity of the housing with the tissues 26. If, however, the user wishes to insert more tissues, or a larger box of tissues, than allowed for by the capacity of the housing 10, the elastic cords 22 will stretch to accommodate the additional volume, positioning the housing as shown by the dashed lines of the housing 10.

Thus, the tissue container, when mounted, can be fairly narrow in width to allow for more head room in the vehicle when less tissues are inserted in the housing 10. However, it is capable of holding a larger quantity of tissues without any changes to the container. The tissue container 2 is flexible in capacity, allowing for more head room with less tissues for smaller vehicles and for the carrying of more tissues with larger vehicles that have more head room.

A tissue holder has been described which is mounted to the visor of vehicles and which can be filled with tissues without removing the housing of the tissue container from the visor. Furthermore, the tissue container 2 is flexible in that it takes up less head room in smaller vehicles and provides greater capacity for larger vehicles where more head room is available to the passengers or driver.

Without further elaboration, the foregoing will so fully illustrate my invention that others may, by applying current or future knowledge, adapt the same for use under various conditions of service.

We claim:

1. A tissue container and dispenser comprising a housing defining a volume and at least one elastic cord for removably connecting said housing to a visor, said housing comprising an open back and a plurality of fastening members, said at least one elastic cord circumscribing said visor, said at least one elastic cord being releasably connected to said plurality of fastening members so that by disconnecting said at least one elastic cord from said plurality of fastening members along one side of the housing, said one side of said housing is movable away from said visor while said housing remains attached to said visor to expose the open back for refilling of tissues without removing the housing from said visor, said at least one elastic cord being stretchable to allow said tissue container and holder to hold a volume of tissues greater than the volume of said housing.

2. The tissue container and dispenser of claim 1 wherein said housing comprises a first and a second side wall, a top wall, a bottom wall and a front wall containing an opening for dispensing said tissues.

3. The tissue container and dispenser of claim 2 wherein each of said at least one elastic cord includes a first and a second elongated fastening member.

4. The tissue container and dispenser of claim 3 wherein said at least one elastic cord comprises a first and a second elastic cord.

5. The tissue container and dispenser of claim 4 wherein said first and second side walls each have an inner edge and each of said plurality of fastening members comprises indentations at each of said inner edges, said indentations defining an enclosed area in which said elongated fastening members are releasably attached.

6. The tissue container and dispenser of claim 4 wherein said first and second side walls include openings in communication with said enclosed areas.

7. The tissue container and dispenser of claim 6 further comprising clamps which clamp together said first and second free ends of said at least one elastic cord.

8. A tissue container and dispenser for use on an automobile visor, said tissue container comprising a housing which defines a volume and said housing is secured to said visor, said housing comprising a first and a second side wall, top wall, bottom wall and a front wall containing an opening for dispensing said tissues, said housing further including an open back and a plurality of fastening members for releasably securing said housing to said visor, said fastening members being releasable on one side of the housing so that said housing is movable away from said visor at said one side while said housing remains attached to said visor to expose the open back for refilling of tissues without removing the housing from said visor.

9. The tissue container and dispenser of claim 8 wherein said housing has four corners and said fastening members are provided adjacent the four corners.

10. The tissue container and dispenser of claim 9 and further including at least one elongated band for mounting said housing to said visor, said band having releasable fastening members for securing said housing to said visor.

* * * * *